J. R. FLANNERY & E. I. DODDS.
STAY BOLT FOR BOILERS.
APPLICATION FILED FEB. 21, 1917.
1,298,318.
Patented Mar. 25, 1919.
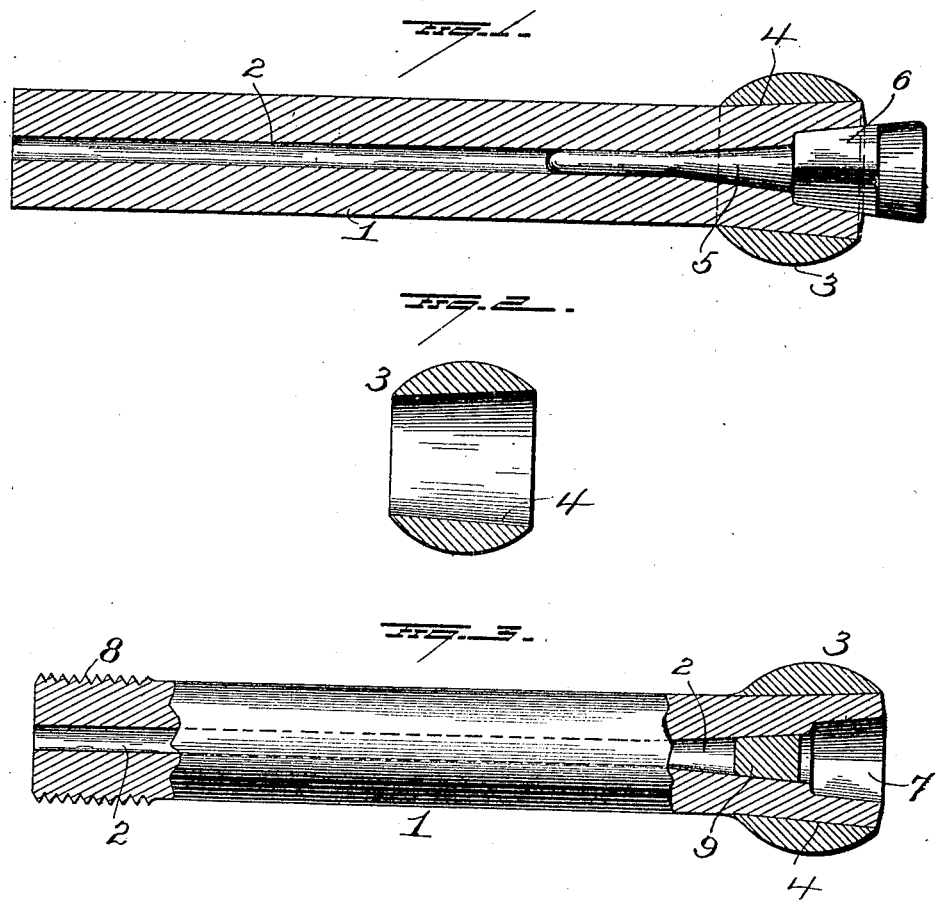
WITNESSES
INVENTORS
Attorneys

UNITED STATES PATENT OFFICE.

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT FOR BOILERS.

1,298,318.

Specification of Letters Patent. Patented Mar. 25, 1919.

Application filed February 21, 1917. Serial No. 150,202.

*To all whom it may concern:*

Be it known that we, JOHN R. FLANNERY and ETHAN I. DODDS, citizens of the United States, and residents of Pittsburgh, in the county of Allegheny and State of Pennsylvania, have invented certain new and useful Improvements in Stay-Bolts for Boilers; and we do hereby declare the following to be a full, clear, and exact description of the invention, such as will enable others skilled in the art to which it appertains to make and use the same.

This invention relates to improvements in staybolts for boilers and more particularly to such as are known in the art as "flexible stay bolts," having tell-tale holes,—one object of the invention being to utilize tubular iron bars in the construction of staybolts, and to provide a simple construction of headed end for the bolt without liability of closing the bore in the body of the bolt during the act of providing the bolt with its head.

A further object is to provide a tubular bolt body with a separate partly spherical head of simple construction, and to so construct the device that it shall be provided with a tell-tale hole extending continuously from the inner end of said bolt to the headed outer end and be permanently closed at said outer headed end.

With these and other objects in view the invention consists in certain novel features of construction and combinations of parts as hereinafter set forth and pointed out in the claims.

In the accompanying drawings; Figure 1 is a longitudinal sectional view illustrating the manner of constructing our improved stay bolt; Fig. 2 is a sectional view of the head, and Fig. 3 is a sectional view of the completed bolt.

1 represents a tubular bolt body, the bore 2 in which extends from end to end thereof.

The head 3 for the outer end of the bolt is made partly spherical so that it may have a suitable bearing in a bearing sleeve (not shown) secured to the outer boiler sheet, in a manner well known in flexible staybolt structures. In the present instance the head 3 is in the form of a sleeve or annulus having a convex peripheral face, and having an inner tapering face 4,—the taper flaring outwardly from the inner to the outer end of the sleeve.

In assembling the head on the body of the bolt, the interiorly tapering sleeve will first be placed on the end of the bolt body and then a conical expanding tool 5 will be driven into the end of the bore 2 so as to expand the metal at the end of the bolt body in the annular head and caused to conform to the tapering wall of the latter. The expanding tool is preferably made with an angular portion 6 whereby an angular socket 7 will be formed in the end of the body of the finished bolt, for the reception of a suitable wrench whereby the threaded inner end 8 of the bolt may be screwed through the inner boiler sheet.

After the annular partly spherical head shall have been secured to the bolt body and the expanding tool withdrawn, the outer end of the continuous bore 2 which forms the telltale hole for the bolt, will be permanently closed by means of a plug 9 (preferably of metal) driven into said bore at the headed end of the bolt, leaving the bore or tell-tale hole continuous from said plug to the inner end of the bolt.

Having fully described our invention what we claim as new and desire to secure by Letters-Patent, is:—

1. A stay bolt comprising a body and a separate head, the head having a tapering opening to receive the expanded end portion of the body of the bolt, the said head being rigidly secured on said expanded end portion.

2. A stay bolt comprising a body portion having a continuous bore extending through the same, an annular head having a convex outer face and having a tapering opening flaring outwardly toward its outer end, said bolt body having the metal within said head expanded into comformity to the tapering opening in the head, and a plug closing the outer end of said bore at the headed outer end of the bolt.

3. A stay bolt comprising a body and a separate head, the head having an opening through the same to receive a plain unthreaded end of the bolt, and the bolt having a tell tale bore extending throughout its length, and a plug closing the tell tale bore at the head end of the bolt.

In testimony whereof, we have signed this specification in the presence of two subscribing witnesses.

JOHN ROGERS FLANNERY.
ETHAN I. DODDS.

Witnesses:
F. H. ALLISON,
EDWIN S. RYCE.

Copies of this patent may be obtained for five cents each, by addressing the "Commissioner of Patents, Washington, D. C."